United States Patent [19]

Bernhardt et al.

[11] 4,197,693
[45] Apr. 15, 1980

[54] FEEDER HOUSING SEAL

[75] Inventors: Richard P. Bernhardt, Leola; Robert L. Bowman, Ephrata; Everett C. Cowan, Jr., Parkesburg, all of Pa.

[73] Assignee: Sperry Rand Corporation, New Holland, Pa.

[21] Appl. No.: 8,142

[22] Filed: Jan. 31, 1979

[51] Int. Cl.² ............................................. A01F 12/00
[52] U.S. Cl. ................................... 56/14.6; 130/27 R
[58] Field of Search ................... 56/14.6, 208, 15.8, 56/15.9; 130/27 R, 27 T

[56] References Cited

U.S. PATENT DOCUMENTS

| | | | |
|---|---|---|---|
| 3,516,530 | 6/1970 | Braet | 56/14.6 |
| 3,648,709 | 3/1972 | De Coene | 130/27 JT |
| 3,794,047 | 2/1974 | De Coene | 130/27 T |
| 3,826,350 | 7/1974 | Fowler et al. | 198/82 |
| 3,939,847 | 2/1976 | Straeter | 56/14.6 |
| 3,971,390 | 7/1976 | McDuffie et al. | 130/27 JT |
| 3,973,380 | 8/1976 | Knollman | 56/14.6 |
| 4,075,824 | 2/1978 | Hengen | 56/14.6 |

*Primary Examiner*—Jay N. Eskovitz
*Attorney, Agent, or Firm*—John B. Mitchell; Frank A. Seemar; Larry W. Miller

[57] ABSTRACT

The disclosure is directed to a combine with a unique sealing arrangement between the pivotable feeder housing and the inlet opening. The rearward portion of the feeder housing, extending into the inlet opening, includes spaced apart arcuate smooth edge plates which mate with, but do not contact, sealing blocks affixed to the inside vertical side edges of the inlet opening. The feeder housing further includes axially aligned pivot arms which extend away therefrom to engage a pair of support yokes which permit the housing to pivot vertically. The pivot arms and the edge plates have the same central axis so that pivoting of the feeder housing does not interfere with the sealing block/edge plate relationship.

6 Claims, 4 Drawing Figures

FEEDER HOUSING SEAL

BACKGROUND OF THE INVENTION

This invention relates generally to crop harvesting machines commonly known as combines, and specifically to an improved connection between a pivotable feeder housing and the inlet opening of a combine which seals the junction to reduce crop losses.

A combine typically includes a mobile frame containing a threshing and separating mechanism for reducing the crop picked up from the field to a useful and marketable condition. The forward portion of the frame is formed with an inlet opening containing guide means for directing crop material toward the threshing and separating mechanism. A forwardly disposed transverse harvesting header removes the crop from the field, delivers it rearwardly to a feeder housing, or elevator, which in turn delivers the crop material into the inlet opening. The feeder housing is pivotably mounted to the frame to permit vertical movement of the header and fine adjustment for the accommodation of different headers.

Much of the innovative effort in this general technology is directed toward improving the efficiency of the harvesting operation. More specifically, the technically most efficient machines are those which are designed, and improved, to maximize the crop harvest while minimizing the required input in labor and energy. The invention described herein is directed primarily to the maximization of the volume of crop harvested by the reduction of losses in the particularly vulnerable junction area between the pivotable feeder housing and the inlet opening in the frame.

It has been found extremely difficult to construct a pivotable feeder housing extending partly into the inlet opening of a combine which does not permit undesirable grain loss through the vertical interfaces. The solution heretofore used was to attach the feeder housing to the combine frame and then manually select and affix shims to the feeder housing adjacent the inlet opening. While this latter procedure does block a substantial portion of the affected area, it is, nonetheless, not entirely satisfactory. The shimming approach cannot entirely fill the gaps, because to do so would restrict the important pivoting function of the feeder housing.

SUMMARY OF THE INVENTION

It is a feature of the instant invention to provide improved means for reducing grain loss in a combine.

It is another feature of the instant invention to provide means for reducing grain loss between the feeder housing and the inlet opening on a combine.

It is another feature of the instant invention to provide cooperative sealing means on a feeder housing and the interior of the inlet opening which reduces crop loss between the feeder housing and the inlet opening.

It is a further feature of the instant invention to provide a feeder housing with arcuate edge plates thereon which cooperate with spaced matching sealing blocks on a combine frame to create a seal therebetween.

It is a still further feature of the instant invention to provide cooperative means on the inside vertical walls of a combine inlet opening and a feeder housing which maintain a seal therebetween even during relative vertical pivotal movement of the housing relative to the inlet opening.

These features, and other objects, are attained according to the instant invention by providing a combine with a unique sealing arrangement between the pivotable feeder housing and the inlet opening. The rearward portion of the feeder housing, extending into the inlet opening, includes spaced apart arcuate smooth edge plates which mate with, but do not contact, sealing blocks affixed to the inside vertical side edges of the inlet opening. The feeder housing further includes axially aligned pivot arms which extend away therefrom to engage a pair of support yokes which permit the housing to pivot vertically. The pivot arms and the edge plates have the same central axis so that pivoting of the feeder housing does not interfere with the sealing block/edge plate relationship.

BRIEF DESCRIPTION OF THE DRAWINGS

For a better understanding of the invention as well as other objects and further features thereof, reference is made to the following detailed disclosure of the preferred embodiment of the invention taken in conjunction with the accompanying drawings thereof wherein.

DESCRIPTION OF THE PREFERRED EMBODIMENT

Figure 1:
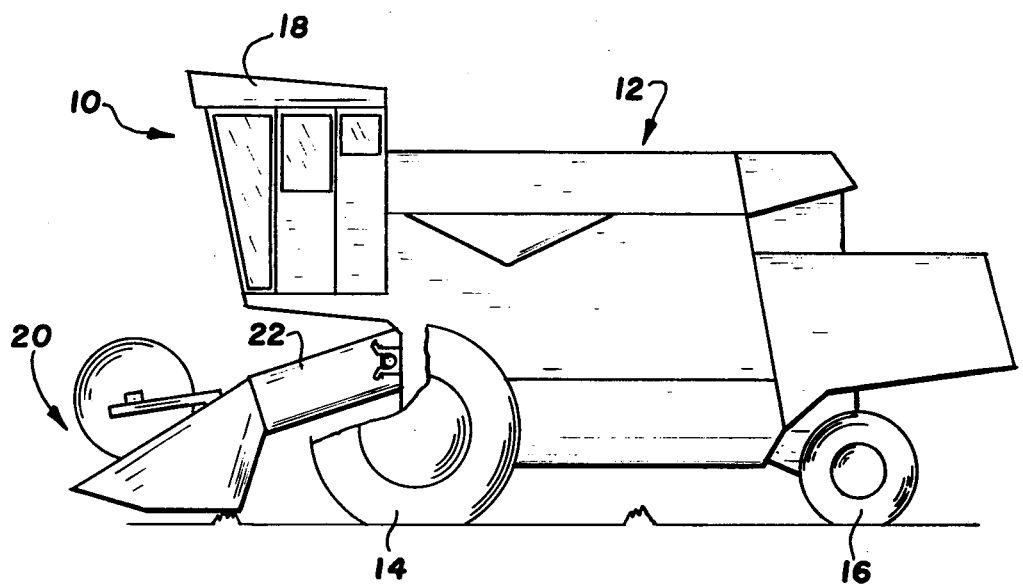
FIG. 1 is a schematic side elevational view of a combine with a feeder housing and header attached thereto.

Referring now to FIG. 1, a combine 10 is schematically illustrated to include a main frame, or body, 12 supported for movement by a pair of front wheels 14 and a pair of rear wheels 16 (only one of each pair being shown). Body 12 encloses the normal working components of a combine such as, for example, an engine, transmission, grain tank, and threshing and separating means. The instant invention, it should be understood, does not relate to or depend upon any specific type of combine, though that shown is of the axial flow type. The operating controls for the combine 10 are situated in a forward cab 18 which is conveniently located for maximum observation of the transverse crop header 20. A feeder housing 22 is connected between the header 20 and main frame 12 to provide a crop flow channel between the header and the threshing and separating means. The feeder housing 22 is pivotally connected to the main frame 12 by a pair of yokes 30, 32 (see FIG. 2) which permit the forward portion of the housing, and thus the header 20, to move through a vertical arc. Hydraulic cylinders (not shown) are the conventional means by which the feeder housing is raised and lowered.

Figure 2:
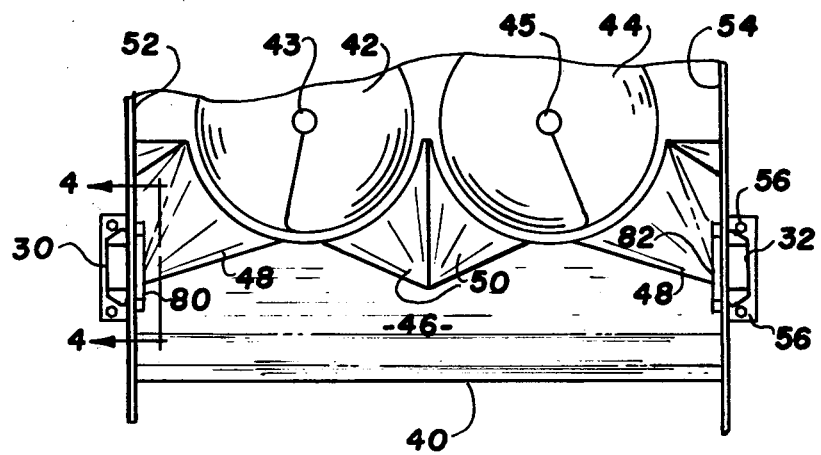
FIG. 2 is a partial schematic frontal view of the inlet opening of the combine of FIG. 1.

Attention is directed briefly to FIG. 2 which is a frontal partial schematic view of the combine showing the generally rectangular inlet opening 40. A pair of axially aligned rotors 42, 44 are rotatably supported, respectively, on shafts 43, 45 and are spaced slightly rearwardly of the plane of inlet opening 40. The rotors 42, 44 comprise part of the threshing and separating means of the axial flow combine shown. Angular guide surfaces 46, 48 and 50 direct the crop material from the feeder housing 22 toward and into the threshing and separating means. It should also be noted here that inlet opening 40 includes a pair of opposing vertical sidewalls 52, 54. Furthermore, it should be readily apparent that the yokes 30, 32 are affixed to main frame 12 and may be vertically adjustable relative thereto by a series of bolts 56. The vertical adjustment feature permits manual lateral fine adjustment of the harvesting header 20.

Figure 3:
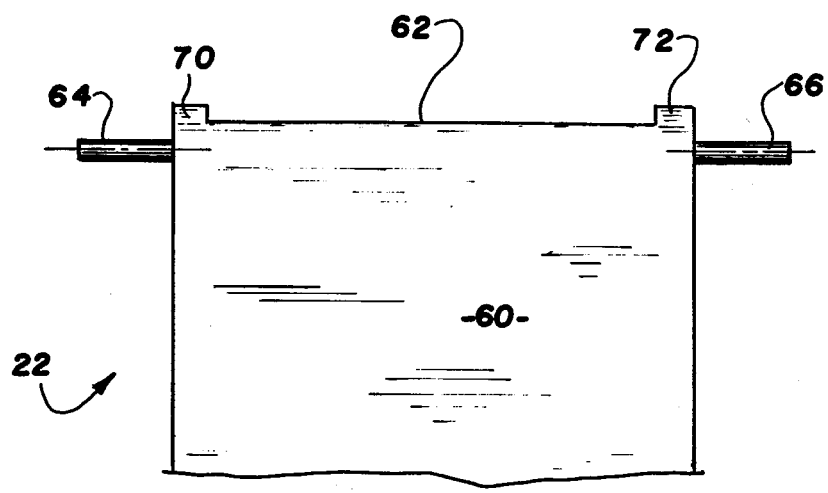
FIG. 3 is a partial schematic bottom plan view of the feeder housing of the combine of FIG. 1.

FIG. 3 is a partial schematic bottom plan view of the rearward portion of feeder housing 22. It can be seen that the housing comprises a main body portion 60 with a rearward opening 62. Feeder housing 22 is, as generally known in the art, substantially a rectangular boxlike structure having opposing sides, a top, a bottom and two opposing ends which are at least partially opened. The internal mechanism, unrelated to this instant invention, usually includes some type of apron or beater assembly which engages and moves the crop material upwardly and rearwardly from the header to the inlet opening of the combine. Body portion 60 further includes a pair of opposing arms 64, 66 which are axially aligned and extend laterally away from the housing adjacent the rearward end thereof. Arms 64 and 66 engage, respectively, yokes 32 and 30 to pivotally support the feeder housing on the forward portion of the combine 10. The yokes include locking mechanisms to hold the feeder housing in place which are not shown, but well known in the prior art. The rearward end of the body portion 60 extends partially into the inlet opening 40 of the combine to provide a more secure flow of crop material into the threshing and separating means. One of skill in the art will readily realize that either, or both, of the arms 64, 66 may include internal shafts which are driven externally to rotate the apron mechanism (not shown). Importantly, that portion of the feeder housing which extends into the inlet opening includes a pair of edge plates 70 and 72 which are, respectively, axially aligned with the arms 64, 66. The edge plates 70, 72 are semi-circular in configuration with a common central axis with the arms 64, 66.

Figure 4:
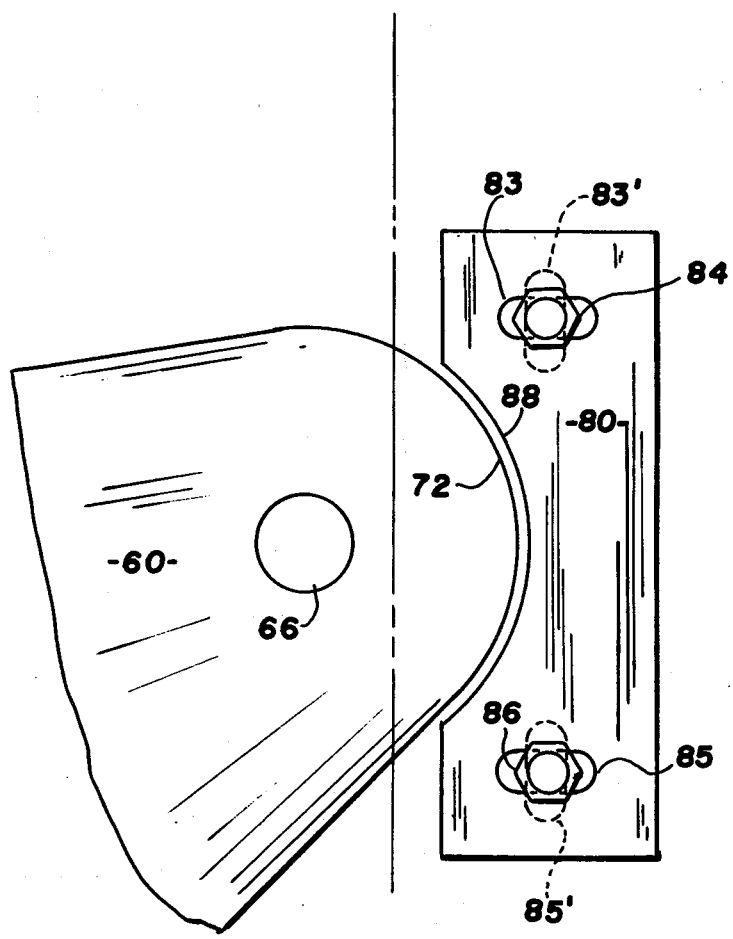
FIG. 4 is a partial schematic cross sectional view of the sealing means of the instant invention taken along lines 4—4 of FIG. 2, with a portion of a feeder housing added.

Referring now to FIG. 4, which is a schematic partial cross sectional view of FIG. 2 with the feeder housing in place, it can be seen that a sealing block 80 is affixed to the sidewall 52 by a pair of spaced bolts 84, 86. Elongate slots 83, 83' 85 and 85' permit lateral and vertical adjustment of the block 80. A curved surface 88 is formed on one side of the sealing block to generally match the shape of edge plate 72. More accurately, the curves 72 and 88 have the same central axis as arm 66, so so that vertical movement of feeder housing 22 does not appreciably modify the relationship between the surfaces. Block 80 may comprise any suitable rigid or semi-rigid material such as, for example, metal or hard rubber.

The curved surfaces 72 and 88 are spaced from each other a slight distance, for example about 1/32 inch to about 1/16 inch, to maintain the seal, yet prevent any interference between the elements.

In operation, as best understood with reference to FIGS. 2 and 4, the feeder housing 22 is pivotable about the axis of arms 64, 66. The fact that the curved side of the sealing plates and the edge plates have at least partially a common central axis permits the seal to be maintained no matter what the angular relationship between the feeder housing and the inlet opening. By providing similar devices on the two sides of the inlet opening, it is readily apparent that crop losses due to irregular fittings between the elements are reduced.

It will be understood that various other changes in the details, materials, steps, arrangements of parts and uses which have been hereindescribed and illustrated in order to explain the nature of the invention will occur to and may be made by those skilled in the art, upon a reading of this disclosure, and such changes are intended to be includes within the principles and scope of this invention.

Having thus described the invention, what is claimed is:

1. In a crop threshing and separating machine having a mobile body, means mounted on the body to thresh and separate grain from crop material, a forward crop inlet opening with vertical opposing side edges in the body, guide means within the inlet opening to direct crop material toward the means to thresh and separate including vertical sidewalls adjacent the vertical opposing side edges of the inlet opening, means for elevating crop material from the field to the inlet opening, and means for mounting the means for elevating to the body to maintain a crop material flow relationship between the means for elevating and the inlet opening while permitting selective vertical pivotal relative movement therebetween, the means for mounting including first and second yokes affixed to the body on respective sides of the inlet opening and first and second axially aligned arms affixed to the means for elevating in respective engagement with the first and second yokes, the improvement wherein:

said means for elevating has a partially opened first end which extends into said inlet opening, said first end including first and second arcuate smooth edge plates with a central axis corresponding to that of said arms; and sealing means within said inlet including first and second sealing blocks one affixed to each said vertical sidewall and having an arcuate forward portion corresponding to the arcuate portion of said edge plates, said sealing blocks positioned to be closely adjacent to, but spaced from, said edge plates, whereby crop material moving towards said means to thresh and separate cannot escape between said means to elevate and said inlet opening side edges.

2. The machine of claim 1 wherein, said yokes are vertically adjustable and said first and second sealing blocks are vertically and laterally adjustable.

3. The machine of claim 2, wherein, the spacing between said sealing blocks and the respective cooperating edge plate is in the range of from about 1/32 inch to about 1/16 inch.

4. The machine of claim 3 wherein said first and second sealing blocks comprise a rigid material.

5. The machine of claim 3 wherein, said first and second sealing blocks comprise a semi-rigid material.

6. A threshing and separating machine comprising:
(a) a mobile body adpated to move across a field;
(b) means mounted on said body for threshing and separating grain from crop material;
(c) a forward inlet opening with vertical opposing side edges in the body;
(d) guide means within said inlet opening to direct crop material towards said means for threshing and separating including vertical sidewalls adjacent said opposing side edges of said inlet opening;
(e) means for elevating crop material from the field to the inlet opening, said means for elevating having a partially opened first end which extends into said inlet opening, said first end including first and second arcuate smooth edge plates with a common central axis;

(f) means for mounting said means for elevating to the body to maintain a crop material flow relationship between the means for elevating and said inlet opening while permitting selective vertical pivotal relative movement therebetween, said means for mounting including first and second yokes affixed to said body on respective sides of said inlet opening and first and second axially aligned arms affixed to said means for elevating in respective engagement with said first and second yokes, said first and second arms having a central axis corresponding to that of said arcuate smooth edge plates; and (g) sealing means within said inlet opening including first and second sealing blocks one affixed to each of said vertical sidewall and having an arcuate forward portion corresponding to the arcuate portion of said edge plates, said sealing blocks positioned to be closely adjacent to, but spaced from, said edge plates, whereby crop material moving towards said means to thresh and separate cannot escape between said means to elevate and said inlet opening side edges.

* * * * *